(12) United States Patent
Culpepper

(10) Patent No.: US 8,588,613 B1
(45) Date of Patent: Nov. 19, 2013

(54) SYNC DISTRIBUTION OVER A NON-TRAFFIC BEARING CHANNEL

(75) Inventor: Stephen H. Culpepper, Sharpsburg, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1134 days.

(21) Appl. No.: 11/965,649

(22) Filed: Dec. 27, 2007

(51) Int. Cl.
*H04J 14/02* (2006.01)
*H04J 3/16* (2006.01)

(52) U.S. Cl.
USPC .............. 398/98; 398/74; 398/75; 370/498; 370/473; 370/354; 370/503; 370/509

(58) Field of Classification Search
USPC ............. 398/9, 14, 25, 30–35, 154, 155
See application file for complete search history.

(56) References Cited

U.S. PATENT DOCUMENTS

| | | | |
|---|---|---|---|
| 6,441,955 B1 * | 8/2002 | Takatsu et al. ............. | 359/341.4 |
| 7,136,388 B2 * | 11/2006 | Friedrichs et al. ....... | 370/395.62 |
| 7,346,279 B1 * | 3/2008 | Li et al. ............................ | 398/32 |
| 2001/0038475 A1 * | 11/2001 | Wolf ............................... | 359/124 |
| 2003/0059160 A1 * | 3/2003 | Rikitake et al. ................. | 385/24 |
| 2003/0108265 A1 * | 6/2003 | Rao et al. ........................ | 385/11 |
| 2004/0013129 A1 * | 1/2004 | Fang ............................ | 370/466 |
| 2004/0120351 A1 * | 6/2004 | Li et al. ......................... | 370/498 |
| 2005/0207755 A1 * | 9/2005 | Rabbat et al. .................... | 398/59 |
| 2006/0018475 A1 * | 1/2006 | Vig et al. ....................... | 380/256 |
| 2007/0212063 A1 * | 9/2007 | Meli et al. ....................... | 398/30 |

OTHER PUBLICATIONS

Lee [Implementation and Transmission Experiment of 40Gb/s Transponder Accommodating 4 Channels of 10Gb/S Optical Signals].*
Shepard ["SONET/SDH Demystified" pp. 72-78].*
Kartalopoulos ["DWDM Networks, Devices and Technology" pp. 244-247].*

* cited by examiner

*Primary Examiner* — Shi K Li
*Assistant Examiner* — Oommen Jacob
(74) *Attorney, Agent, or Firm* — Parks IP Law LLC; Jennifer P. Medlin, Esq.

(57) ABSTRACT

Systems, methods, and computer-readable media for propagating a timing signal over a Dense Wave Division Multiplexer fiber optic network by polarity modulation of the Optical Service Channel are provided. The systems, methods, and computer-readable media may make the timing signal available for use by devices that require a reference timing source.

19 Claims, 6 Drawing Sheets

SYNC DISTRIBUTION OVER A NON-TRAFFIC BEARING CHANNEL

BACKGROUND

Fiber optic networks are commonly used to transfer large amounts of digital voice, video, and/or data throughout communication networks. These fiber optic networks transfer data through a series of fiber optic nodes. Fiber optic connections typically support a significantly higher data transfer rate than is necessary to transmit the data of any single network user, under-utilizing significant amounts of bandwidth. In order to better utilize this tremendous bandwidth potential, multiple streams of data from multiple network sources are frequently combined into a single data stream and transmitted over a single fiber optic cable. The electronic equipment necessary to achieve this multiplexing comes at a significant cost. One way of combining multiple streams of data is a technique known as Wavelength Division Multiplexing (WDM). WDM transmits different streams of data over a single fiber optic cable by simultaneously transmitting the different streams of data at different wavelengths of light. Upon receipt of a WDM signal, the different wavelengths of light are separated, and the original data streams are reconstituted. By utilizing WDM techniques, some Dense Wavelength Division Multiplexing (DWDM) fiber optic nodes can simultaneously transmit 32 or more channels of data, each channel having a capacity of 10 gigabits per second, for instance.

In addition to WDM techniques, it is possible to multiplex many streams of data into a single fiber optic data stream using Time Division Multiple Access (TDMA) multiplexing (or "time division multiplexing"). Time division multiplexing cycles through multiple source data streams, transmitting a segment of each source data stream over a time slice of the multiplexed data stream. Upon receiving the multiplexed stream, time division de-multiplexing is applied to break the stream into its component source data streams. One key to efficient Time Division Multiplexing is the availability of accurate synchronization information. Unlike packet-switched networks, OSI Layer 1 protocols used in fiber optic transmissions contain no internal indication of the beginning or the end of a time slice, and so identification of the beginning and the end of a time slice requires accurate synchronization. When available, external timing sources typically provide this synchronization information. Current methods of distributing synchronization to different nodes in the fiber optic network for use in WDM multiplexing include transmitting synchronization information over a traffic-bearing channel, and installing a reference timing source in proximity to each node in the network. There is a need for reliable yet low-cost means of distributing synchronization information to nodes in a WDM fiber optic network without consuming a traffic-bearing channel, and without the expense of installing a primary reference timing source in proximity to every node in the network.

The description below addresses these and other shortcomings in the present art.

SUMMARY

A system for distributing a primary reference timing source over a fiber optic network is described herein. One such system may include a primary reference timing source, a source Dense Wave Division Multiplexing (DWDM) node in proximity to the primary reference timing source, and a fiber optic cable connecting the source DWDM node to a destination DWDM node. The DWDM nodes transmit data over the fiber optic cable utilizing the Wavelength Division Multiplexing (WDM) method of multiplexing multiple data streams over a single cable. In addition, all DWDM nodes are connected by an Optical Service Channel (OSC). The OSC is a non-traffic bearing channel used for out-of-band communication, including alarm, status and provisioning information. In one embodiment, synchronization from the reference timing source is transmitted from the reference timing source to a first DWDM node, and from the first DWDM node to the destination DWDM node via the OSC.

Another method may include determining, at a first fiber optic node, a reference timing signal generated by a timing source, wherein the first fiber optic node is a DWDM node, and where the timing source is a primary reference timing source. The reference timing signal is then transmitted to a second DWDM node over a non-traffic bearing channel of a fiber optic network by periodically changing the polarity of the OSC channel.

Another device may include one or more computer-readable storage media comprising computer-executable instructions for transmitting a reference timing signal from a first network node to a second network node over a non-traffic bearing fiber optic channel. The first and second network nodes may in one embodiment be DWDM nodes. In another embodiment the non-traffic bearing fiber optic channel may be an OSC channel. In another embodiment the timing signal may be transmitted by amplitude modulation of the OSC channel. These computer-executable instructions may further use the reference timing signal to enable data-channel multiplexing.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
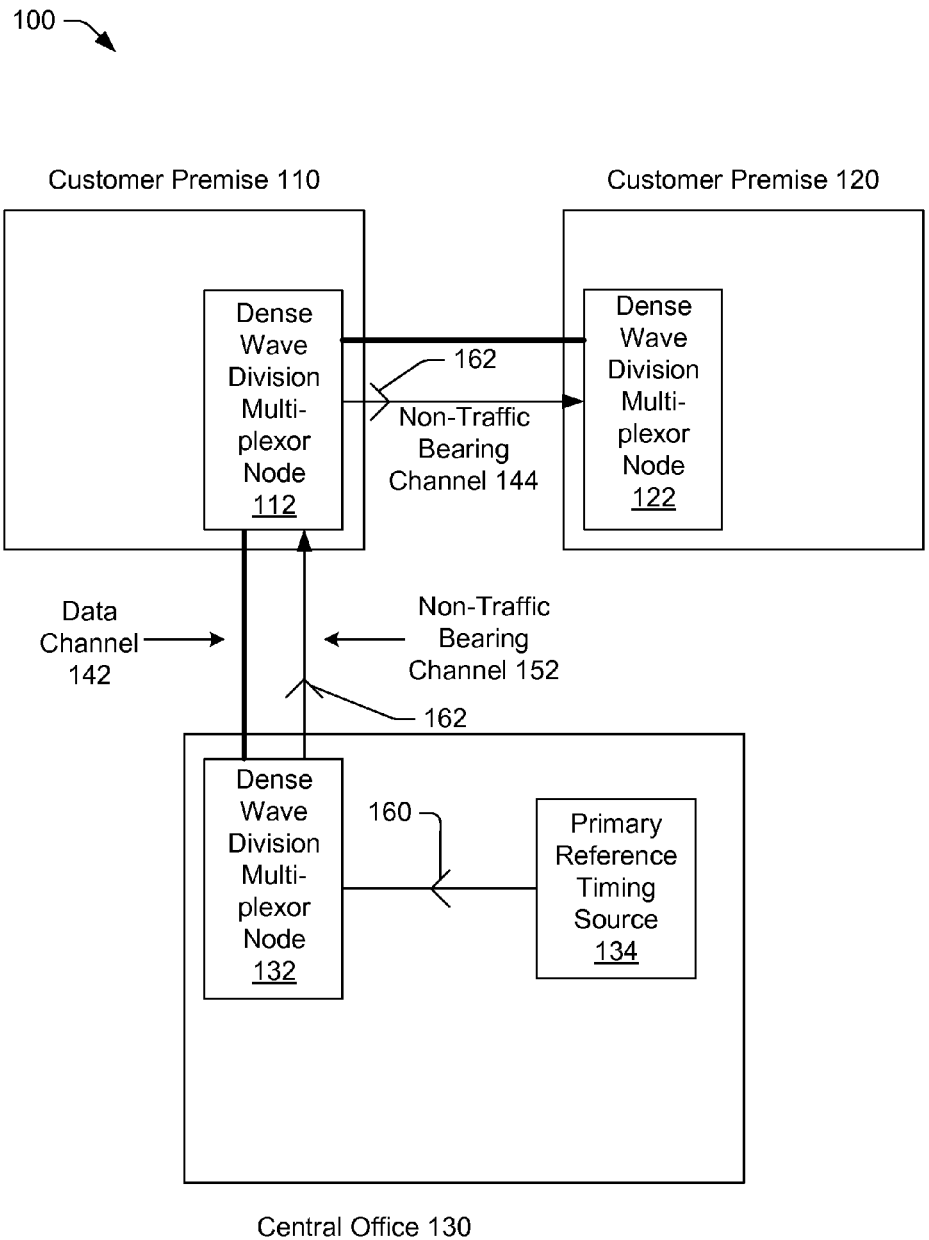
FIG. 1 is a block diagram of a reference timing source propagated through DWDM nodes on OSC channels connecting the DWDM nodes.

FIG. 1 illustrates an environment 100 in which a reference timing source is propagated via Dense Wave Division Multiplexing nodes over Optical Service Channels. In one embodiment, a Primary Reference Timing Source 134, located in a Central Office 130, generates a Timing Signal 160. The Timing Signal 160 may be used to synchronize Time Division Multiplexing devices. In one embodiment, a Dense Wave Division Multiplexing (DWDM) Node 132 receives the Timing Signal 160. An Optical Service Channel (OSC) 152, which is a non-traffic bearing channel, may propagate a Timing Signal 162 derived from the Timing Signal 160 between the DWDM Node 132 and another DWDM Node 112, which is located at a customer premise 110. The Customer Premise 110 may represent an office connected to other customer premises by a private fiber optic network.

The DWDM Node 132 and the DWDM Node 112 may be two nodes of a ring of DWDM Nodes, each enabled to transmit digital voice, video, and/or data over a fiber optic network. Specifically, a Data Channel 142 transmits digital voice, video, and/or data between the DWDM Node 112 and the DWDM Node 132. In one embodiment the Data Channel 142 comprises more than one data channel. In one embodiment, digital voice, video, and/or data are transmitted over the Data Channel 142 utilizing Wavelength Division Multiplexing, which enables simultaneous transmission of different streams of data over the same physical fiber optic cable by transmitting the different data streams simultaneously at different wavelengths of light.

In one embodiment, the Optical Service Channel 152 is transmitted over the same physical fiber optic cable as the Data Channel 142. However, the Optical Service Channel 152 is a non-traffic bearing channel operating on a wavelength of light distinct from the wavelengths of light used to transmit data over the Data Channel 142. In another embodiment, the Optical Service Channel 152 is transmitted over a physical fiber optic cable other than the fiber optic cable used to transmit digital voice, video, and/or data.

In the illustrated embodiment, an Optical Service Channel 144 connects the DWDM Node 112 to yet another DWDM Node 122, located at yet another Customer Premise 120. The DWDM Node 112 transmits the Timing Signal 162 to the DWDM Node 122 over the Optical Service Channel 144. In one embodiment the DWDM Node 112 transmits the Timing Signal 162 by periodically modulating the polarity of the light used to transmit the Optical Signal Channel 144. Polarity modulation of the Optical Service Channel 144 enables the Timing Signal 162 to be transmitted without altering or in any way effecting the information transmitted through the Optical Service Channel 144. In another embodiment, the Optical Service Channel 144 may communicate timing information by transmitting as a Time Division Multiplexed signal of a known rate. The Optical Service Channel 144 may also transmit the Timing Signal 162 in multiple other ways.

In one embodiment, the Optical Service Channel 144 also transmits alarm, status and provisioning information independent of any data transmission, enabling the Timing Signal 162 to be propagated whenever the fiber optic ring is operational. The availability of the Timing Signal 162 at the DWDM nodes 112 and 122, independent of any data transmission, enables the DWDM nodes 112 and 122 to provide synchronization information to devices not used to transmit data over the fiber optic ring.

Once received at a DWDM node, the Timing Signal 162 enables Time Division Multiplexing by providing a means of synchronization. As discussed above, Time Division Multiplexing is another method of transmitting multiple streams of data over a single physical fiber optic cable. Time Division Multiplexing transmits multiple streams of data by dividing the single available data transmission channel into time slices, copying chunks of data from each data source into different slices, and transmitting the chunks of data over the data transmission channel.

Time Division Multiplexing and Wavelength Division Multiplexing may be applied to the same fiber optic connection, as may multiple other methods of transmission. DWDM Nodes use Wavelength Division Multiplexing to simultaneously transmit different data streams over a single fiber optic cable. One of the multiple source data streams of a Wavelength Division Multiplexer may itself be a Time Division Multiplexed data stream. Transmission of a single source data stream may therefore be multiplexed together with other source data streams by Time Division Multiplexing, and the resulting multiplexed data stream may be frequency division multiplexed by a DWDM node.

Synchronization may be necessary to enable Time Division Multiplexing. However, unlike packet-switch networks, WDM fiber optic nodes do not analyze or act upon the data they transmit. Therefore, it is difficult to embed time-slice information in the data, as neither the sending nor the receiving node alters or interprets the data being transferred. Synchronization allows nodes in the fiber optic ring to efficiently time division multiplex multiple source data streams into one transmission data stream, and to de-multiplex a transmission data stream into component data streams. Without accurate timing information, time slices used to transmit chunks of data from particular source data streams must be spaced further apart in order to prevent data corruption.

Figure 2:
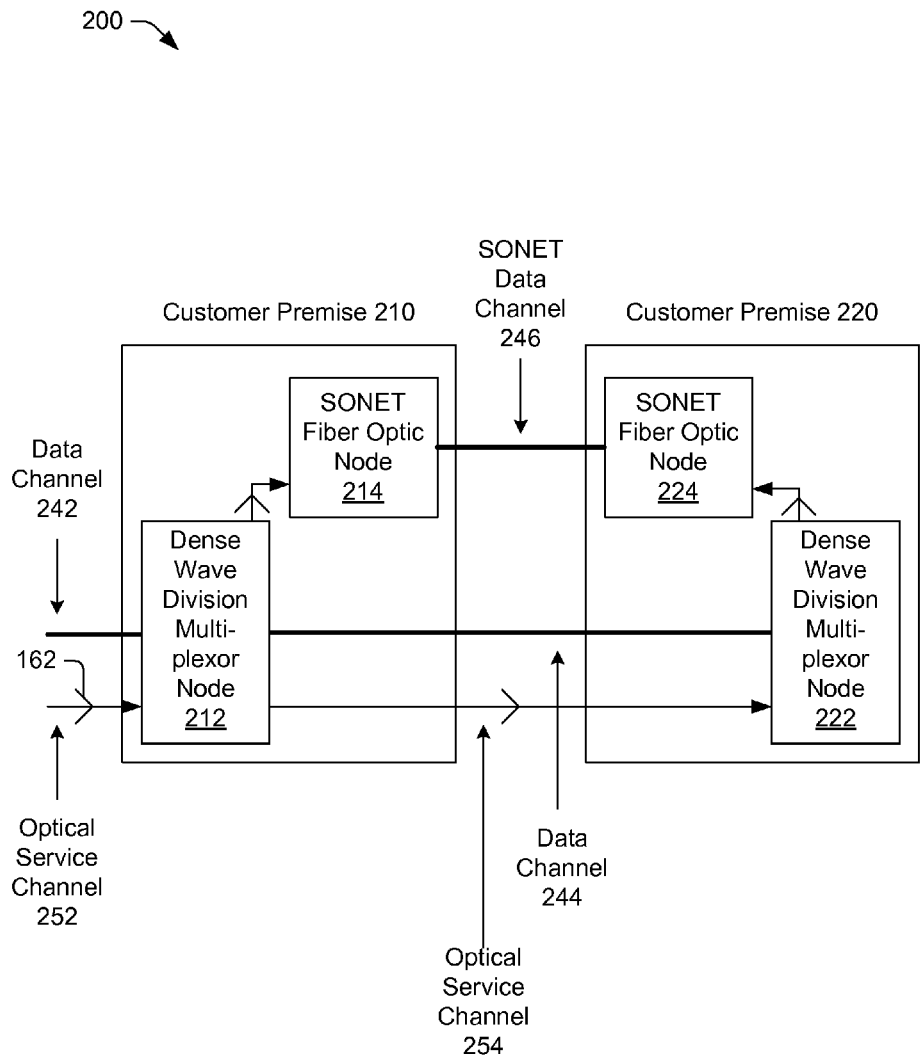
FIG. 2 is a block diagram of a timing signal propagated over an OSC channel providing synchronization information to a pair of SONET fiber optic nodes, each at separate customer premises.

FIG. 2 illustrates another environment 200 in which the Timing Signal 162 derived from the Timing Signal 160 is propagated throughout a series of fiber optic nodes to enable, in one embodiment, Time Division Multiplexing. Here, an Optical Service Channel 252 and a Data Channel 242 couple to a node in the fiber optic ring that communicates a timing signal (such as the Timing Signal 162) over the Optical Service Channel 252, while digital voice, video, and/or data are communicated over the Data Channel 242. A Dense Wave Division Multiplexer (DWDM) Node 212, located at a Customer Premise 210, receives the Timing Signal 162.

The DWDM Node 212 then propagates the Timing Signal 162 to a SONET (Synchronous Optical NETworking) or SDH (Synchronous Digital Hierarchy) Fiber Optic Node 214, located at the Customer Premise 210. Synchronous Optical Networking is a method for communicating digital information over a fiber optic network. A SONET Data Channel 246 connects the SONET Fiber Optic Node 214 to a SONET Fiber Optic Node 224, located at a Customer Premise 220. The SONET Data Channel 246 transmits digital voice, video, and/or data from the SONET Fiber Optic Node 214 to the SONET Fiber Optic Node 224. In accordance with exemplary embodiments, the Timing Signal 162, being provided to the SONET Fiber Optic Node 214 by the DWDM Node 212, is used by the SONET Fiber Optic Node 214 as a source of synchronization information.

In one embodiment, an Optical Service Channel 254 propagates the Timing Signal 162 from the DWDM Node 212 to a Dense Wave Division Multiple Access Node 222, located at the Customer Premise 220. A Data Channel 244 transmits digital voice, video, and/or data between the DWDM Node 212 and the DWDM Node 222. In one embodiment the DWDM Node 222 propagates the Timing Signal 162 to the SONET Fiber Optic Node 224.

Figure 3:
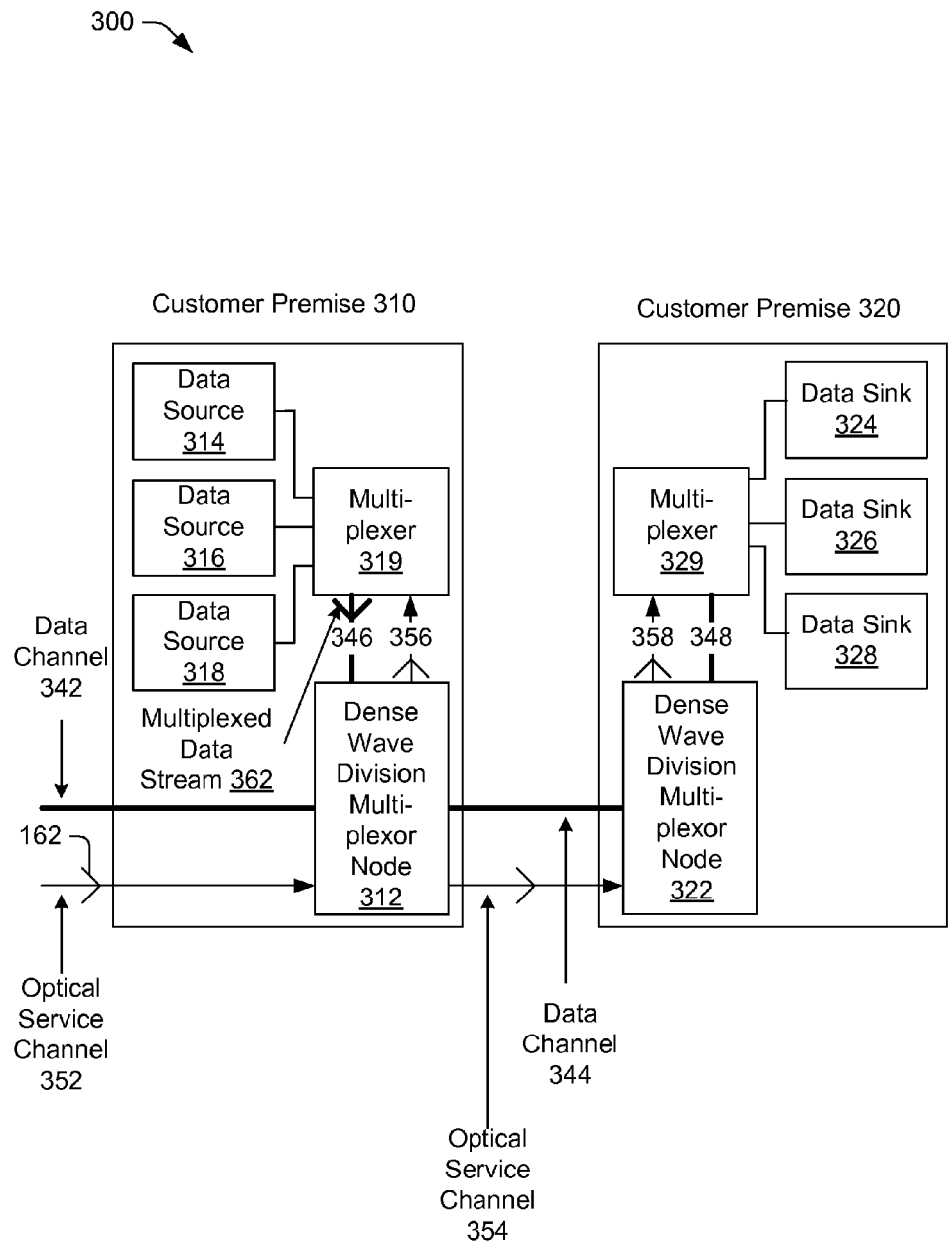
FIG. 3 is a block diagram of a timing signal propagated over an OSC channel providing synchronization to a pair of Muxponder devices, used to multiplex and de-multiplex multiple data sources.

FIG. 3 illustrates another environment 300 in which the Timing Signal 162 is propagated throughout a fiber optic ring to enable, in one embodiment, Time Division Multiplexing. According to exemplary embodiments, an Optical Service Channel 352 and a Data Channel 342 couple to another DWDM node (not pictured) in the fiber optic ring that communicates the Timing Signal 162 over the Optical Service Channel 352, while digital voice, video, and/or data are communicated over the Data Channel 342. In one embodiment, the Data Channel 342 comprises more than one data channel. A Dense Wave Division Multiplexer (DWDM) Node 312, located at a Customer Premise 310, receives the Timing Signal 162. A Connector 356 may propagate the Timing Signal 162 from the DWDM Node 312 to a Multiplexer 319, which is located at the Customer Premise 310. The Multiplexer 319 receives data from Data Sources 314, 316, 318, etc. According to exemplary embodiments, each data source 314, 316, 318 transmits data at a rate less than the per channel transmission rate of the DWDM Node 312. The Multiplexer 319 uses the Timing Signal 162, as received from the DWDM Node 312, to Time Division Multiplex data from the Data Sources 314, 316, 318, etc. A resulting Multiplexed Data Stream 362 is transferred by a Data Connector 346 from the Multiplexer 319 to the DWDM Node 312. The DWDM Node 312 optionally frequency division multiplexes the signal received from the Data Connector 346 with additional data streams.

A Data Channel 344 then transmits the Multiplexed Data Stream 362, output by the Multiplexer 319 and transmitted to the DWDM Node 312, to another Dense Wave Division Multiple Access (DWDM) Node 322 at a Customer Premise 320. An Optical Service Channel 354 propagates the Timing Signal 162 from the DWDM Node 312 to the DWDM Node 322. A Data Channel 348 may transmit the Multiplexed Data Stream 362 from the DWDM Node 322 to a Multiplexer 329. A Connector 358 may then propagate the Timing Signal 162 from the DWDM Node 322 to the Multiplexer 329. According to exemplary embodiments, the Multiplexer 329 utilizes the Timing Signal 162 to de-multiplex the Multiplexed Data Stream 362 into component data streams. These component data streams may be transmitted from the Multiplexer 329 to the Data Sinks 324, 326, 328, etc.

Figure 4:
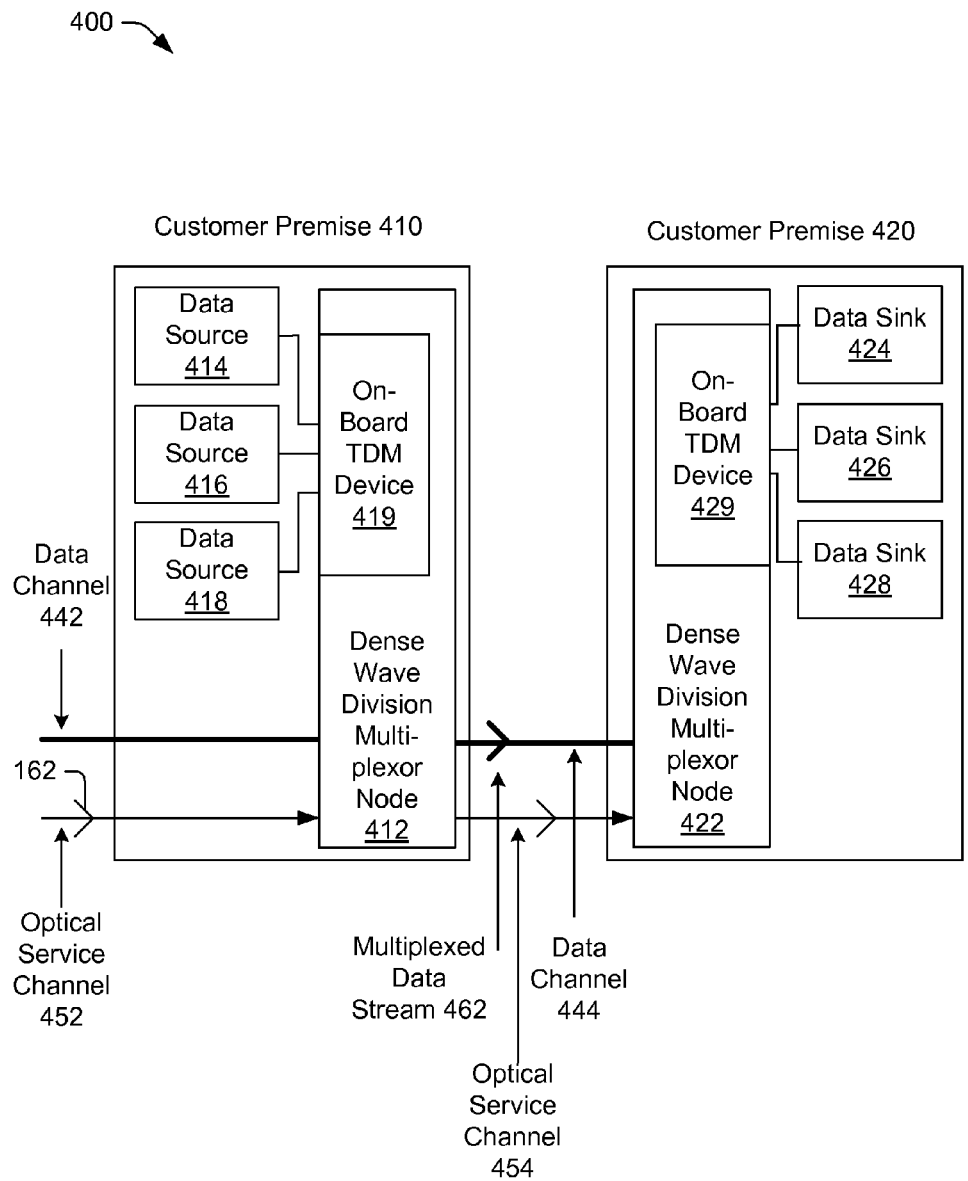
FIG. 4 is a block diagram of a timing signal propagated over an OSC channel providing synchronization to multiplexers built into the DWDM nodes.

FIG. 4 illustrates another environment 400 in which the Timing Signal 162 is propagated throughout a fiber optic ring to enable, in one embodiment, Time Division Multiplexing. An Optical Service Channel 452 and a Data Channel 442 couple to another DWDM node (not pictured) in the fiber optic ring that communicates the Timing Signal 162 over the Optical Service Channel 452, while digital voice, video, and/or data are communicated over the Data Channel 442. In one embodiment the Data Channel 442 comprises more than one data channel. A Dense Wave Division Multiplexer (DWDM) Node 412, located at a Customer Premise 410, receives the Timing Signal 162. The DWDM Node 412 may receive data from Data Sources 414, 416, 418, etc. According to exemplary embodiments, each data source transmits data at a rate less than the transmission rate of the DWDM Node 412. The DWDM Node 412 may contain a On-Board TDM Device 419 which uses the Timing Signal 162 to Time Division Multiplex data from the Data Sources 414, 416, 418, etc.

A Data Channel 444 transmits a Multiplexed Data Stream 462 from the DWDM Node 412 to a Dense Wave Division Multiple Access (DWDM) Node 422 at a Customer Premise 420. An Optical Service Channel 454 propagates the Timing Signal 162 from the DWDM Node 412 to the DWDM Node 422. The DWDM Node 422 may contain a On-Board TDM Device 429, which utilizes the Timing Signal 162 to de-multiplex the Multiplexed Data Stream 462 into component data streams. These component data streams may be transmitted from the DWDM Node 422 to the Data Sinks 424, 426, 428, etc.

Figure 5:
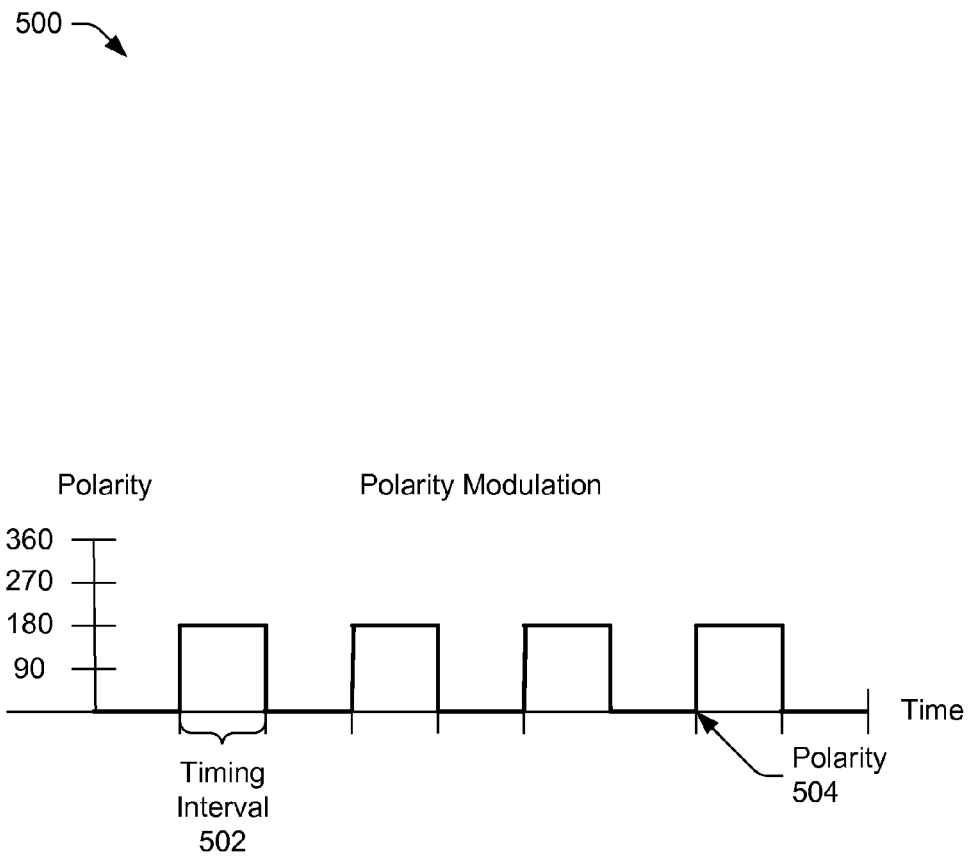
FIG. 5 is graphical representation of polarity modulation, as it is used to convey timing information.

FIG. 5 graphically depicts polarity modulation 500. In one embodiment, polarity modulation of the Optical Service Channel transmits a timing signal from one node in a ring of fiber optic nodes to another. Polarity modulation does not affect the contents of the optical service channel. In one embodiment, a primary reference timing source generates and transmits timing information to a DWDM node. The DWDM node may propagate this timing information by changing the polarity of the light transmitted in sync with the signal from the primary reference timing source. FIG. 5 depicts one possible polarity modulation, where timing information is conveyed by a Polarity 504 alternating between 0 degrees and 180 degrees. The Timing Interval 502 indicates how long the polarity remains at 0 degrees, and how long the polarity remains at 180 degrees. Of course, these polarities are merely illustrative and other polarities may be used in other embodiments.

Figure 6:
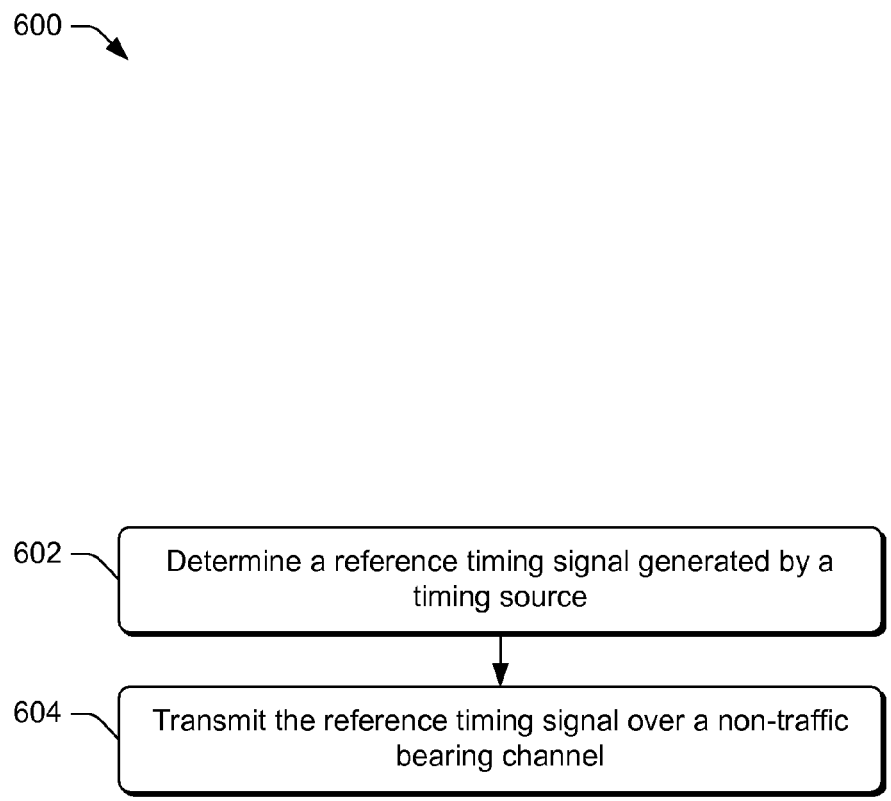
FIG. 6 is a flow diagram that illustrates a process for managing data received from multiple local data sources.

Finally, FIG. 6 represents an illustrative process 600 that may be carried out with the system described above. Process 600 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Operation 602 represents determining a reference timing signal generated by a timing source. This operation may determine the reference timing signal in any of the manners discussed above or otherwise. Operation 604, meanwhile, represents transmitting the timing signal over a non-traffic bearing channel. Again, this operation may accomplish this transmitting in the ways discussed above or otherwise.

It is noted that the various modules shown herein may be implemented in hardware, software, or any combination thereof. Additionally, these modules are shown as separate items only for convenience of reference and description, and these representations do not limit possible implementations of the teachings herein. Instead, various functions described with these modules could be combined or separated as appropriate in a given implementation, without departing from the scope and spirit of the description herein.

CONCLUSION

Although techniques and devices for managing data from multiple data sources have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A method comprising:

receiving, at a second fiber optic node including a second synchronous optical networking multiplexer and data sinks, timing information associated with a reference timing signal generated by a timing source and transmitted from a first fiber optic node, including a first synchronous optical networking multiplexer and data sources, to the second fiber optic node over a non-traffic bearing fiber-optic channel, wherein the first fiber optic node and the second fiber optic node are included in a fiber optic ring, the timing information is transmitted independently of transmission of other data over a fiber optic cable other than a fiber optic cable used to transmit the other data, such that the timing information is available at the second fiber optic node whenever the fiber optic ring is operational, and the timing information provides synchronization to devices included in the fiber optic ring that are not used to communicate the other data, and wherein the non-traffic bearing channel is multiplexed with a data channel by the first synchronous optical networking multiplexer;

using the timing information to enable time-division data-channel de-multiplexing of the non-traffic bearing channel and a data channel by the second synchronous optical networking multiplexer.

2. A method as described in claim 1, wherein the timing information is transmitted over the non-traffic bearing fiber-optic channel by changing polarity of light transmitted to the second fiber optic node in synchronization with the reference timing signal from the timing source, such that the timing information is transmitted to the second fiber optic node by polarity modulation.

3. A method as described in claim 1, wherein the fiber optic nodes are dense wave division multiplexing nodes.

4. A method as described in claim 1, wherein the non-traffic bearing channel is an optical service channel.

5. A method as described in claim 1, wherein a first muxponder performs time-division multiplexing at the first fiber optic node and a second muxponder performs de-multiplexing at the second fiber optic node.

6. A system comprising:

a first fiber-optic node configured to receive timing information associated with a reference timing signal generated by a timing source and transmitted over a non-traffic bearing fiber-optic channel from a second fiber-optic node, wherein the first fiber optic node and the second fiber optic node are included in a fiber optic ring, the timing information is transmitted independently of transmission of other data over a fiber optic cable other than a fiber optic cable used to transmit the other data, such that the timing information is available at the first fiber optic node whenever the fiber optic ring is operational, and the timing information provides synchronization to devices included in the fiber optic ring that are not used to communicate the other data; and a synchronous optical networking multiplexer included within the first fiber-optic node, wherein the timing information enables time division de-multiplexing of a data channel, multiplexed with the non-traffic bearing fiber-optic channel, received from the second fiber optic node, by the synchronous optical networking multiplexer.

7. A system as described in claim 6, wherein the data channel includes multiplexed data from data sources within the second fiber optic node, the system further comprising a time division multiplexing device coupled to the first fiber-optic node and configured to time-division de-multiplex the multiplexed data channel into a plurality of data channels using the timing information.

8. A system as described in claim 7, wherein the time division multiplexing device is a muxponder.

9. A system as described in claim 6, wherein the first fiber-optic node enables the timing information to be received by a device coupled to the first fiber-optic node.

10. A systems as described in claim 6, wherein the non-traffic bearing channel transmits the timing information by amplitude modulation.

11. A system as described in claim 6, wherein the non-traffic bearing channel is an optical service channel.

12. A system as described in claim 6, wherein the first and second fiber optic nodes are dense wave division multiplexing nodes.

13. A computer-readable storage device comprising computer-executable instructions that, when executed on a processor, cause the processor to perform a method comprising:

receiving timing information associated with a reference timing signal, generated by a timing source, transmitted over a non-traffic bearing fiber optic channel from a first network node, including data sources and a first synchronous optical networking multiplexer, to a second network node including data sinks and a second synchronous optical networking multiplexer, wherein the first network node and the second network node are included in a ring, the timing information is transmitted independently of transmission of other data over a fiber optic cable other than a fiber optic cable used to transmit the other data, such that the timing information is available at the second network node whenever the ring is operational, and the timing information provides synchronization to devices included in the ring that are not used to communicate the other data; and using the reference timing signal timing information to enable time-division de-multiplexing of a data channel, multiplexed with the non-traffic bearing fiber-optic channel, received from the first network node data-channel multiplexing multiplexer.

14. The computer-readable storage device of claim 13, wherein the network nodes are fiber-optic network nodes.

15. The computer-readable storage device of claim 14, wherein the fiber-optic nodes are dense wave division multiplexing nodes.

16. The computer-readable storage device of claim 13, wherein the timing information is communicated by a time division multiplexed signal of a known rate.

17. The method of claim 1, further comprising:

at the first fiber optic node, time-division multiplexing a plurality of data streams into a multiplexed data stream using the timing information or de-multiplexing a multiplexed data stream into a plurality of data streams using the timing information; and at the second fiber optic node, time-division de-multiplexing a multiplexed data stream into a plurality of data streams using the timing information or multiplexing a plurality of data streams into a multiplexed data stream using the timing information.

18. The method of claim 2, wherein the timing information is transmitted over the non-traffic bearing fiber-optic channel by polarity modulation that occurs periodically.

19. The method of claim 1, wherein the timing information is transmitted over the non-traffic bearing fiber-optic channel by polarity modulation that occurs in synchronization with the timing information.

\* \* \* \* \*